United States Patent [19]
Lavergne

[11] 3,716,111
[45] Feb. 13, 1973

[54] METHOD FOR INDUCING SHEAR WAVES IN THE EARTH AND DEVICE THEREFOR
[75] Inventor: Michel Lavergne, Le Vesinet, France
[73] Assignee: Institut Francais du Petrole des Carburants et Lubrifiants
[22] Filed: Aug. 28, 1970
[21] Appl. No.: 67,873

[30] Foreign Application Priority Data

Sept. 2, 1969 France..................................6929979

[52] U.S. Cl. ......181/.5 EC, 340/15.5 SW, 181/.5 NC
[51] Int. Cl. ...............................................G01v 1/14
[58] Field of Search.............340/15.5 SW; 181/.5 EC

[56] References Cited
UNITED STATES PATENTS 3,205,971   9/1965   Clynch..........................340/15.5 SW
2,740,489   4/1956   White et al..........................181/0.5
2,760,591   8/1956   White et al..........................181/0.5
3,372,770   3/1968   Clynch..................................181/0.5
3,159,233  12/1964   Clynch et al. ........................181/0.5

Primary Examiner—Benjamin A. Borchelt
Assistant Examiner—N. Moskowitz
Attorney—Craig, Antonelli & Hill

[57] ABSTRACT

Method for inducing shear waves in the earth, comprising a generator producing two equal and opposed forces and means for transmitting said forces horizontally to vertical sections of the ground through the intermediary of springs of different rigidities, whereby said forces become unbalanced and the resultant force is transmitted horizontally to the ground.

14 Claims, 11 Drawing Figures

INVENTOR
MICHEL LAVERGNE

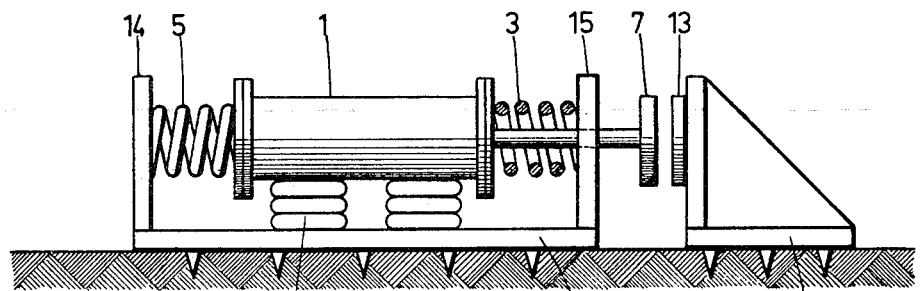
FIG.8
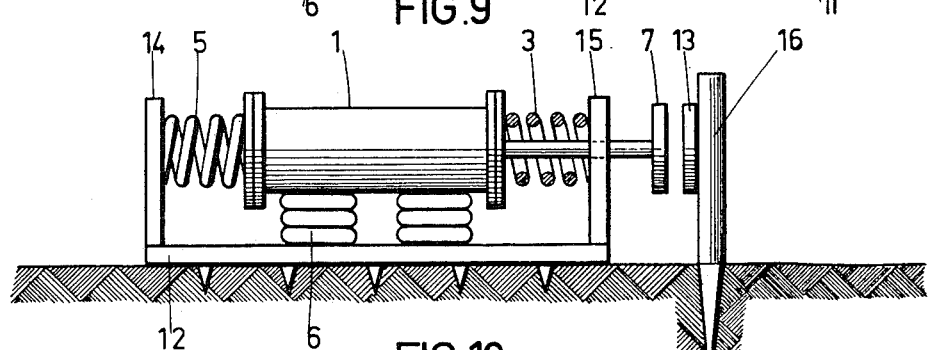
FIG.9
FIG.10
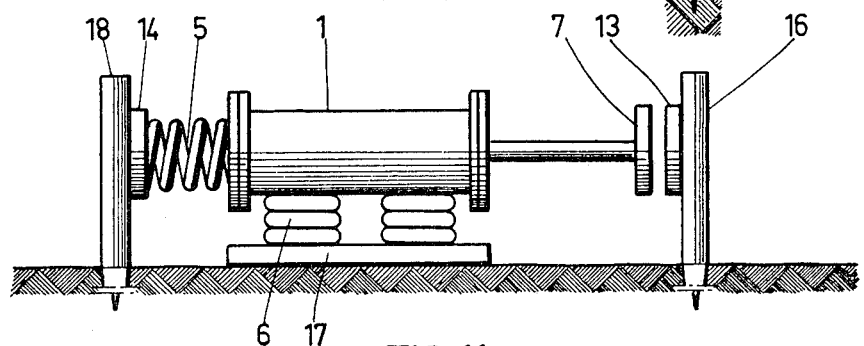
FIG.11
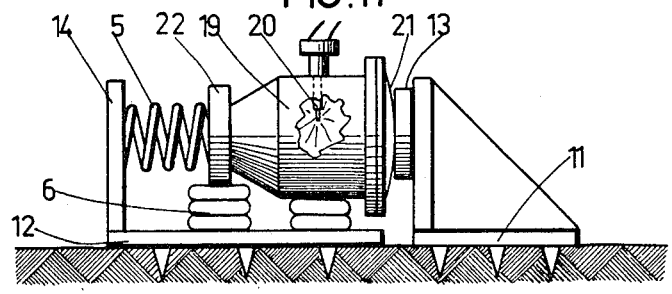

METHOD FOR INDUCING SHEAR WAVES IN THE EARTH AND DEVICE THEREFOR

According to the methods commonly used in seismic prospecting, acoustic waves are transmitted into the earth and propagate through the sub-soil. There are mainly used those waves which propagate through the deep formations by expansion and are reflected by the different sub-soil strata. These waves are commonly called longitudinal waves and known in the art as P-type waves.

However other waves which are propagated in depth by distorsion and reflected by the sub-soil formations are also of interest. These waves, called shear waves are of two types:

- the shear waves imparting to the particles a horizontally polarized motion, called in the art SH waves, and
- the shear waves imparting to the particles a vertically polarized motion, called in the art SV waves.

The use of shear waves in seismic prospecting may frequently give further informations in addition to those derived from the study of the longitudinal waves, so that in some cases the seismic informations have a greater significance with respect to the surveyed sub-soil strata.

Many reasons confirm the interest of making use of the shear waves such as:

a. their propagation velocity through the sediments is about one half of the corresponding velocity of the longitudinal waves and accordingly, the wave length of the shear wave is about one half of the wave length of the longitudinal wave, at the same frequency. The resolution power, i.e., the capability of identifying two sub-soil layers at small distance from each other is substantially improved, which in some cases is of high interest particularly for detailed surveys of bevelled formations or stratigraphic traps.

b. the horizontally polarized shear waves (SH waves) exhibit the peculiar property of being not converted to other types of waves in the presence of stratigraphic discontinuities, to the extent that such discontinuities are symmetrical with respect to the waves propagation vertical plane. In contrast to the longitudinal (P) waves which undergo a conversion to vertical shear waves (SV) or to the vertical shear waves (SV) which undergo a conversion to longitudinal (P) waves at each sub-soil interface and when the wave fronts are not parallel to the interfaces, the SH shear waves are never converted to a wave of a different type. The seismograms obtained in oblique incidence on terrains exhibiting many discontinuities are accordingly much simpler when using SH waves rather than P or SV waves.

c. with the knowledge of the shear waves propagation velocity, together with the knowledge of the longitudinal waves propagation velocity and of the specific gravities of the terrain, it is possible to determine certain physical parameters of the rocks such as Young's modulus, Poisson's coefficient, rigidity modulus, compressibility modulus, such determination being impossible when only the longitudinal waves propagation velocities are known.

Several methods have been contemplated for transmitting shear waves but they do not offer the advantages of the method of this invention whereby much shorter pulses of a purer shape are produced.

A first method consists of using horizontal vibrators, imparting to the ground alternative horizontal motions by friction (for example U.S. Pat. Nos. 3,159,233 and 3,286,783). The inconvenience of this method results from the fact that the pulses generated by vibrators are of a long duration, usually several seconds. Although they can be contracted at the recording by use of the correlation techniques, it is apparent that, in some cases, shorter pulses must be generated having for example a duration of less than 30 milliseconds.

Another method consists of horizontally propelling a mass against a stop member fastened to the ground, so as to impart a horizontal force thereto, (for example U.S. Pat. No. 2,740,488). However, according to this method, the mass is suspended from a beam by cables, which presents some drawbacks. In particular the action and the reaction forces on the ground are not controllable.

It is an object of the present invention to provide a new method for transmitting shear waves to the earth and an apparatus therefor whereby shorter pulses of purer shape are generated and the action and reaction forces produced are controllable.

This method consists of producing by means of a generator two equal and opposed forces $F_1$ and $F_2$, controlling said forces by means of systems having different rigidity coefficients, respectively $k_1$ and $k_2$ so as to obtain opposed and unequal forces $F'_1$ and $F'_2$ which are imparted to the earth along a substantially horizontal direction.

The device for performing this method comprises a generator providing two equal and opposed forces $F_1$ and $F_2$, means for controlling said forces and converting the same to opposed and unequal forces $F'_1$ and $F'_2$ and means for transmitting said forces $F'_1$ and $F'_2$ to the earth along a substantially horizontal direction.

This device further comprises frictionless connecting means between the generator and the earth.

The invention will be described more in detail with reference to non limitative specific embodiments given for illustrative purposes, in conjunction with the accompanying drawings in which:

FIG. 1 illustrates the principle of the method of the invention.

FIG. 2 diagrammatically shows a first embodiment of apparatus for performing the method of the invention.

FIG. 3 is a diagram obtained by plotting forces $F'_1$ and $F'_2$ applied to the ground along a substantially horizontal direction, versus time.

FIG. 3 is a diagram obtained by plotting the resultant force $F'_t$ applied to the ground in a substantially horizontal direction, versus time.

FIG. 4 diagrammatically illustrates the position of the transmitting and receiving devices in the case of shear waves of the SV type.

FIG. 5 diagrammatically illustrates the position of the transmitting and receiving devices in the case of shear waves of the SH type, FIG. 6 diagrammatically shows a second embodiment of the device according to the invention.

FIG. 7 diagrammatically shows a third embodiment of the device.

FIG. 8 diagrammatically shows a fourth embodiment of the device.

FIG. 9 diagrammatically shows a fifth embodiment of the device.

FIG. 10 diagrammatically shows a seventh embodiment of the device, and,

FIG. 11 diagrammatically shows a seventh embodiment of the device.

The working generator G whose vertical axis passes at point O generates simultaneously a horizontal force $F_1$ in the OX direction and a horizontal force $F_2 = F_1$, in the opposed direction (O − X). The device includes means 3 and 5 for controlling respectively the action and reaction forces $F_1$ and $F_2$ and rendering them unequals. These means may be deformable elements with rigidity coefficients $k_1$ and $k_2$, acting for respectively converting the forces $F_1$ and $F_2$ in forces $F'_1$ and $F'_2$. The devices further includes elements 2 and 4 for transmitting the forces $F'_1$ and $F'_2$ respectively in direction OX and (O − X). Said forces are imparted to the ground either directly by means of the transmission members 2 and 4 applied against ground walls substantially perpendicular to the OX axis, or through stop members anchored in the ground and placed at distances $x_1$ and $x_2$ from point O, respectively in the directions OX and O − X.

The forces $F'_1$ and $F'_2$ being unequal, a resultant force $F'_t$ is transmitted to the earth in the form of a seismic pulse.

As a matter of fact the distance $x_1 x_2$, of about one meter, is generally small as compared to the lengths of the transmitted waves (at least about 10 meters) and the impact points $x_1$ and $x_2$ of forces $F'_1$ and $F'_2$ may be considered as a single point with respect to the scale of the transmitted seismic waves.

The horizontal force $F'(t)$ applied on the earth has accordingly as algebraic value the sum $F'_1(t) + F'_2(t)$.

One of the essential features of this invention is the fact that the rigidity $k_1$ of the control element 3 and the rigidity $k_2$, of a different value, of the control element 5, are so selected that the transfer functions $F'_1/F_1$ and $F'_2/F$ be different, whereby there can be obtained forces $F'_1(t)$ and $F'_2(t)$ which are unequal in absolute value in spite of the equality of the absolute values of $F_1(t)$ and $F_2(t)$.

Consequently the resultant force $F'(t) = F'_1(t) + F'_2(t)$ applied horizontally onto the ground is not zero and can be selected at will of the desired shape and magnitude by varying the rigidity coefficients $k_1$ and $k_2$ of elements 3 and 5.

The force generator G may be for example a percussion system, the energy source being pneumatic, hydraulic or electromagnetic, or, if desired an explosion system, the energy source being a solid, liquid or gaseous explosive charge, a sparker or a system with an explosive wire or the like.

A few specific embodiments of a device for performing the method of the invention are described below by way of non-limitative examples.

According to a first embodiment, illustrated in FIG. 2, the generator G is, for example, a percussion system comprising a piston actuated from a cylinder 1; the force $F_1$ is transmitted through piston 7 and the force $F_2$ through cylinder 1 of this system.

The generator G is frictionless supported on a carrier member 6, e.g., a pneumatic tube. The stresses induced in the earth through the carrier member 6 have substantially no horizontal component since the carrier is frictionless operated.

By way of example the resultant force $F'(t)$ horizontally applied onto the ground in the case of the embodiment of FIG. 2, will be determined hereinafter:

Let:
$m$ be the mass of piston 7
$x$ its distance from point O in the OX direction, ($\dot{x}$ its velocity)
$m_3$ the mass of cylinder 1,
$x_3$ its distance from point O along axis −XOX ($\dot{x}_3$ its derivative with respect to time, i.e., its velocity)
$m_1$ the mass of pulsing plate 2
$x_1$ its distance from point O along axis −XOX ($\dot{x}_1$ its derivative with respect to time, i.e., its velocity)
$m_2$ the mass of the pulsing plate 4
$x_2$ its distance from point O along axis −XOX ($\dot{x}_2$ its derivative with respect to time, i.e., its velocity)

For sake of simplification it will be assumed that the connection between piston 7 and pulsing plate 2 is rigid ($k_1 = \infty$) Let:

$\Phi$ be the friction coefficient of the system during the back motion of cylinder 1
$\gamma_1$ and $\gamma_2$ the earth admittances corresponding respectively, for plates 2 and 4 to the ratio $\dot{x}_1/F'_1$, $\dot{x}_2/F'_2$.

The working principle of the system is represented by the group of relationships, written in harmonic condition of pulsation $\omega$, as follows:

(1)
$$F_2 - \left(\frac{k_2}{j\omega} + \phi\right)(\dot{x}_3 - \dot{x}_2) = jm_3\omega\dot{x}_3$$

$$F'_2 - \left(\frac{k_2}{j\omega} + \phi\right)(\dot{x}_3 - \dot{x}_2) = jm_2\omega\dot{x}_2$$

$$F_1 + F'_1 = j(m + m_1)\omega\dot{x}_1$$

$$F'_1 = \frac{\dot{x}_1}{\gamma_1}$$

$$F'_2 = \frac{\dot{x}_2}{\gamma_2}$$

By eliminating $\dot{x}_3$, $\dot{x}_2$ and $\dot{x}_1$ between these 5 relationships and having in mind that $F_2 = -F_1$, there are obtained forces $F'_1$ and $F'_2$ in harmonic condition:

(2)
$$F'_1 = \frac{F_1}{1 - j(m+m_1)\omega\gamma_1}$$

(3)
$$F_2 = \frac{F_1}{1 - j(m_3 + m_2)\omega\gamma_2 - \frac{m_3\omega^2}{k_2 + j\omega\phi}(1 - jm_2\omega\gamma_2)}$$

It is thus possible to adjust $F'_1$, by variation of $m$ and $m_1$, which is equivalent to the variation of the coupling of plate $m_1$ with the ground. It is possible to adjust $F'_2$ by variation of $m_3$, $m_2$, $\Phi$ and $k_2$.

The system for applying the forces to the ground is represented by the transfer functions $F'_1/F_1$ and $F'_2/-F_1$, functions of the frequency.

The transfer function $F'_1/F_1$ can be caused to correspond for example to a resonance at high frequency and poorly damped and the transfer function $F'_2/-F_1$ to a low frequency and well damped resonance.

The resultant force $F'(t)$ applied to the earth is then formed of a positive component, short in time and having a high amplitude, essentially due to $F'_1(t)$, and a negative component, extending over a longer time, and having a small amplitude, essentially due to $F'_2(t)$.

By way of illustration the values of functions $F'_1(t)$ and $F'_2(t)$ will be calculated for the case of a hard ground (small admittance, $\gamma_1 = \gamma_2 \cong 0$)

The transfer functions $F'_1/F_1$ and $F'_2/-F_1$ given by relationships (2) and (3) are then simplified to:

$$F'_1/F_1 = 1, \text{ and} \qquad (4)$$

$$\frac{F'_2}{-F_1} = \frac{1 + j\omega \frac{\phi}{k_2}}{1 + j\omega \frac{\phi}{k_2} - \frac{m_3}{k_2}\omega^2} \qquad (5)$$

It appears that $F'_1(t) = F_1(t)$

In order to obtain $F'_2(t)$, there will be used the Fourier's inverse transform of the transfer function of second order given by relationship (5).

Let:

$\omega_0 = \sqrt{k_2/m_3}$ be the own pulsation of the system formed by cylinder 1 and spring 5, $n = \phi/(2\omega_0 m_3)$ be the damping coefficient.

$U(t)$ the Heaviside scale unit:

$U(t) = o$ for $t < o$ $= 1$ for $t > o$

* the convolution sign

There is obtained:

For $n > 1$:

$$F'_2(t) = -F_1(t) * \omega_0 \frac{e^{-n\omega_0 t}}{\sqrt{n^2 - 1}} \qquad (6)$$

$\{\sinh \sqrt{n^2-1}\ \omega_0 t - 2\eta \sinh(\sqrt{n^2-1}\ \omega_0 t - \text{Arg ch }\eta)\} U(t)$ For $n = 1$:

$$F'_2(t) = -F_1(t) * \omega_0 e^{-\omega_0 t}\{-\omega_0 t + 2\} U(t) \qquad (7)$$

For $n < 1$:

$$F'_2(t) = -F_1(t) * \omega_0 \frac{e^{-n\omega_0 t}}{\sqrt{1 - \eta^2}} \qquad (8)$$

$\{\sin \sqrt{1-\eta^2}\ \omega_0 t - 2\eta \sin(\sqrt{1-\eta^2}\ \omega_0 t - \text{Arc cos }\eta)\} U(t)$ FIG. 3 diagrammatically shows, by way of example, the magnitude of the force $F'_2(t)$ applied to the ground by the shear waves transmitter in the particular case where the rigidity $k_2$ of spring 5 is so selected that $\omega_0 = \sqrt{k_2/m_3}$ is equal to 62.8, i.e., where the resonance frequency of mass $m_3$ of cylinder 1 on the spring 5 is equal to 10 Hertz and the damping coefficient $n$ is 1.

It has been assumed that the force $F_1(t)$ applied by the generator G was of the form indicated in the figure, with a time constant selected at about 5 milliseconds.

$F'_1(t) = F_1(t)$ is the force applied by plate 2 onto the ground. It is equal to the force applied by the generator as the ground is supposed to have a small admittance coefficient $\gamma \cong 0$.

$F'_2(t)$ is the reaction force exerted by plate 4 onto the ground through spring 5.

$F'(t) = F'_1(t) + F'_2(t)$ is the horizontal force applied on the ground by the device.

The force $F'(t)$ is applied along the direction OX at an application point which may be considered as the medium point O of the device.

The parameters $k_2$, $k_1$, $m_3$, $m$ will be selected in accordance with the frequencies, so that:

(a) $f_o = (\omega o)/(2\pi)$ is lower or equal to the smallest useful frequency of the transmission spectrum. For example, in seismic prospecting, where the useful band is between 10 and 100 Hertz, $f_o$ may be chosen, as in the example of FIG. 3, equal to 10 Hertz.

(b) $f_1 = (\omega 1)/(2\pi)$, with $\omega_1 = \sqrt{k_1/m_1}$, is higher than $f_o$ without upper limit i.e., $f_o < f_1 < \infty$.

In the case of FIG. 3, for example the selected value of $f_1$ is $f_1 = \infty$, this being achieved very easily by making rigid the connection between piston 7 and plate 2, i.e., by choosing $k_1 = \infty$.

In practice the upper limit of the transmitted frequencies is not defined by $f_1$ but by the own frequency $f_G$ of generator G or by the coupling frequency $f_C$ of the plate 2 with the ground having the admittance $\gamma_1$.

The dampening coefficient $n = \Phi/(2\omega_0 m_3)$ will be selected high enough for avoiding the so-called "singing" phenomenon due to a too small damping. In practice this coefficient must be higher than 0.3.

In the case, for example, where $0.3 < n < 1$ the higher $n$, the greater is the damping.

When $n \geq 1$ the damping is total.

The adjustement of $n$ may be achieved by changing the friction coefficient $\Phi$.

The selection of the OX axis direction depends on the type of shear wave to be transmitted.

for transmitting shear waves of the SV type, the OX axis will be oriented in the direction of the seismic profile on survey, the seismographs being also placed horizontally in the direction of the profile, so as to receive SV waves.

for transmitting shear waves of the SH type, the OX axis will be oriented in a direction perpendicular to the seismic profile on survey, the seismograph being also placed horizontally in a direction perpendicular to the profile, so as to receive SH waves.

Other embodiments of the device for performing the invention may be contemplated.

Figure 1:
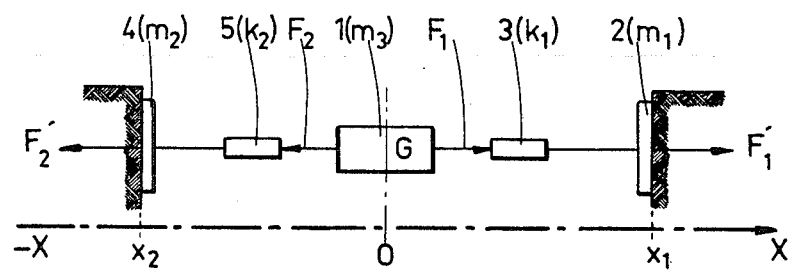
Figure 2:
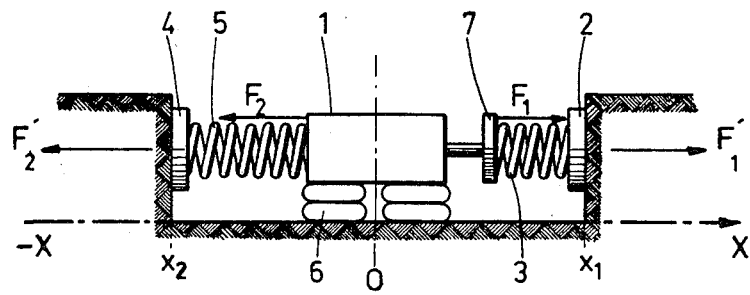
Figure 3:
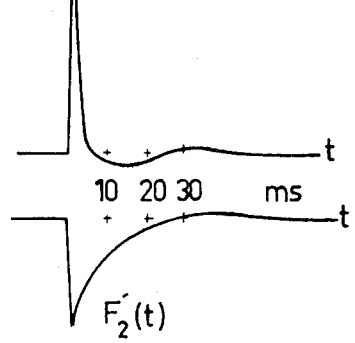
Figure 3:
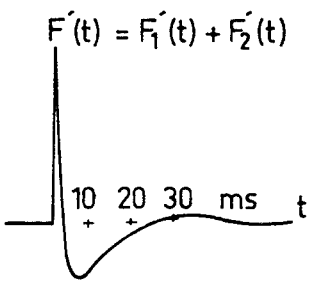
Figure 4:
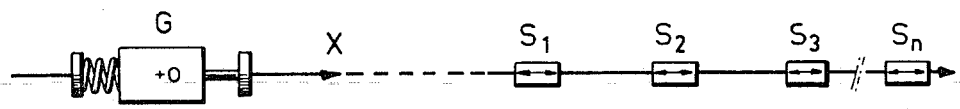
FIG. 4 is a diagrammatic plane view of the assembly of transmitter G and seismographs $S_1, S_2, S_3 \ldots S_n$ for use in a prospection by means of SV waves.
Figure 5:
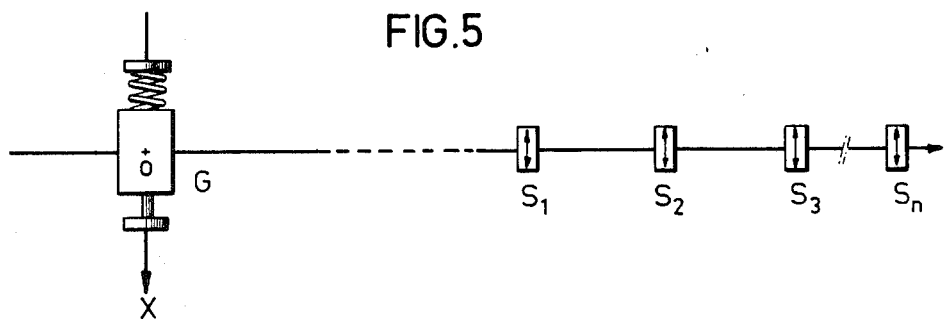
FIG. 5 is a diagrammatic plane view of the assembly of transmitter G and seismographs $S_1, S_2, S_3 \ldots S_n$, for use in a prospection by means of SH waves.
Figure 6:
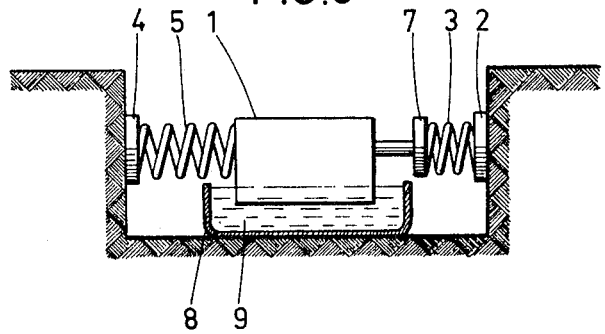

For example, according to a second embodiment, which is a variant of the device illustrated in FIG. 2, the frictionless elastic connecting means 6 is replaced with a liquid. In this case the cylinder 1 of the generator floats on a liquid 9 placed in a vessel 8, as shown in FIG. 6.

The operation of the device in this case is the same as in the case of FIG. 2.

Figure 7:
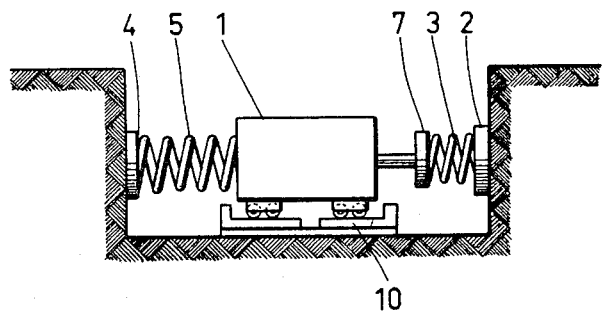

According to a third embodiment of the device of this invention, illustrated in FIG. 7, the frictionless elastic connection is achieved by roller bearing means. The cylinder 1 of the generator in this case rests on the ground through the intermediary of bearings 10.

According to a fourth embodiment of the shear waves transmitting device, the horizontal forces $F'_1$ and $F'_2$ are imparted to the ground through the intermediary of plates 11 and 12 covered with spikes.

The plate 12 is integral with a stop member 13 on which piston 7 will strike. The plate 12 supports the generator cylinder 1 through a frictionless system; the cylinder and opposed to piston 7 takes its bearing on a stop member 14 integral with plate 12, through the intermediary of a spring 5 of a rigidity $k_2$ or on two stop members 14 and 15 through the intermediary of two springs 5 and 3 of respective rigidities $k_2$ and $k_1$.

According to a fifth embodiment of the device, which is a variant of the preceding one, the plate 11 is replaced with a pile 16 imbedded in the ground. The pile supports the stop member 13 on which piston 7 strikes (FIG. 9).

According to a sixth embodiment, illustrated in FIG. 10, and which is a variant of the preceding embodiment, the cylinder 1 of the generator rests on the ground through the intermediary of the frictionless elastic connection system 6 and a plate 17. The forces $F'_1$ and $F'_2$ are imparted to the ground through two vertical stop members imbedded in the ground, for example piles 16 and 18 respectively provided with stop members 13 and 14. The end of the cylinder 1 which is opposed to piston 7 takes its bearing during the back motion, on the stop member 14 through a spring 5.

Optionally the spring 5 may even be omitted and the connection between cylinder 1 and stop members 14 made rigid provided there is induced an unsymmetry between the forces $F'_1$ and $F'_2$ imparted to the ground, by introducing a dissymmetry in the conditions of coupling between piles 16 and 18 and the ground: for example the pile 16 is deeply imbedded so as to obtain a high frequency coupling with the ground and the pile 18 is embedded at low depth so as to obtain a low frequency coupling with the ground.

It is also possible to obtain such a low frequency coupling by directly laying cylinder 1 on the loose ground.

A seventh embodiment for the transmission of shear waves by means of a generator making use of explosive charges is illustrated in FIG. 11.

In this case the energy is generated in the form of a pressure wave by the explosion, in a chamber 19 containing a liquid of an explosive charge 20; the liberated force is transmitted to the ground through one of the walls of the chamber which consists of a deformable membrane 21.

The generator rests on the ground, for example as in the case of FIG. 8, through the intermediary of a frictionless elastic connection system 6 and a plate 12 provided with spikes imbedded in the ground.

The plate 12 being provided with a vertical stop member 14 on the side of the rigid end portion 22 of the chamber 19 which is opposed to the deformable wall 21. A spring 15 connects the stop member 14 to this end portion 22. Another vertical stop member 13, integral with a plate 11, substantially horizontal and fastened to the ground by means of spikes, is placed on the side of the deformable wall 21 of the chamber.

At the time of the explosions the force $F'_1$ is transmitted to the ground through the deformable wall 21 and the stop member 13 whereas the force $F'_2$ is transmitted through the end portion 22, the spring 5 and the stop member 14.

The principle of application of the forces to the ground is the same as in the various preceding cases.

It is clear the previously described device making use of an explosive charge may be replaced with any other device adapted to generate a pressure variation within a chamber containing a liquid, or the liquid of the chamber may be replaced by a gaseous explosive mixture, without departing from the scope and the spirit of the invention, such changes being intended to be within the full range of equivalence of the following claims.

What I claim is:

1. A method for transmitting shear waves to the ground comprising generating two equal and opposed forces, adjusting said two forces by applying thereto different multiplying coefficient so as to obtain two opposed and unequal forces, and simultaneously applying the two forces unequal to the ground along a substantially horizontal direction.

2. A device for transmitting shear waves to the ground comprising a generator (G) producing two equal and opposed first and second forces ($F_1$ and $F_2$), means for controlling said forces including means for applying to said first force ($F_1$) a first multiplying coefficient ($k_1$) and to said second force ($F_2$) a second multiplying coefficient ($k_2$), such that first and second opposed and unequal resultant forces ($F'_1$ and $F'_2$) are provided, and means for simultaneously transmitting said resultant forces to the ground along a substantially horizontal direction.

3. A device according to claim 2 wherein said means for applying said first coefficient ($k_1$) is a spring (3).

4. A device according to claim 2 wherein said means for applying said second coefficient ($k_2$) is a spring (5).

5. A device according to claim 2 wherein the generator (G) comprises essentially a cylinder (1) and a piston (7) movable with respect to each other.

6. A device according to claim 2 wherein the generator (G) comprises essentially a closed chamber (19) containing a liquid, said chamber provided at one end thereof with a deformable wall (21) and at the other end with a rigid wall (22).

7. A device according to claim 2 further comprising frictionless connection means arranged between the generator (G) and the ground for supporting the generator.

8. A device according to claim 7 wherein said connection means consists of elastic means (6) for supporting the generator.

9. A device according to claim 7 wherein said connection means consists of roller means (10) for supporting the generator.

10. A device according to claim 7 wherein said connection means consists of a liquid mass (9) for supporting the generator.

11. A device according to claim 2 wherein the means for transmitting each resultant force ($F'_1$, $F'_2$) to the ground consists of a pulsing plate (2, 4) arranged on a substantially vertical wall of the ground.

12. A device according to claim 2 wherein the means for transmitting each force ($F'_1$, $F'_2$) to the ground consists of a pulsing plate arranged on a substantially vertical stop member (13, 14).

13. A device according to claim 12 wherein each stop member (13, 14) is integral with a pile (16, 18) imbedded in the ground, in a substantially vertical direction.

14. A device according to claim 12 wherein each stop member (13, 14) is integral with an associated substantially horizontal plate (11, 12) fastened to the ground.

* * * * *